United States Patent
Xiao et al.

(10) Patent No.: US 8,059,684 B2
(45) Date of Patent: Nov. 15, 2011

(54) METHOD AND APPARATUS FOR SIGNAL SPLITTING AND COMBINING

(75) Inventors: Xin Xiao, Shenzhen (CN); Shimin Zou, Shenzhen (CN); Zhiqing Yu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1082 days.

(21) Appl. No.: 11/863,683

(22) Filed: Sep. 28, 2007

(65) Prior Publication Data

US 2010/0265953 A1    Oct. 21, 2010

Related U.S. Application Data

(63) Continuation of application No. PCT/CN2006/000505, filed on Mar. 24, 2006.

(30) Foreign Application Priority Data

Apr. 1, 2005 (CN) .......................... 2005 1 0063017

(51) Int. Cl.
*H04J 3/24* (2006.01)
*H04J 3/00* (2006.01)
*H04J 14/00* (2006.01)
*H04J 14/02* (2006.01)

(52) U.S. Cl. ............. 370/474; 370/476; 398/46; 398/79

(58) Field of Classification Search .................. 370/474, 370/476; 398/46, 79, 98, 180
See application file for complete search history.

(56) References Cited

U.S. PATENT DOCUMENTS 4,759,014 A * 7/1988 Decker et al. ................. 370/503

(Continued)

FOREIGN PATENT DOCUMENTS

JP    2004-266480 A    9/2004

(Continued)

OTHER PUBLICATIONS

International Telecommunication Union (ITU), "Interfaces for the Optical Transport Network (OTN); G.709/Y.1331 (Mar. 2003)," G.709/Y.1331 (Mar. 16, 2003).

*Primary Examiner* — Man Phan
*Assistant Examiner* — Ryan Kavleski
(74) *Attorney, Agent, or Firm* — Leydig, Voit & Mayer, Ltd.

(57) ABSTRACT

A method and apparatus for splitting an asynchronous signal are provided. The method includes: buffering, according to frame sequence, an asynchronous signal to be split; and sending n frames of data respectively on n channels in parallel whenever n frames of data have been buffered, where n is a ratio of a rate level of the asynchronous signal before split to that of the asynchronous signal after split. A method and apparatus for signal combination are provided. The method includes: buffering n channels of parallel signals to be combined simultaneously according to frame sequence; and sending n channels of frames serially after one frame is buffered for each of the n channels of the parallel signals; wherein n is a ratio of a rate level of the parallel signals after combined to a rate level of the parallel signals before combined.

5 Claims, 9 Drawing Sheets

U.S. PATENT DOCUMENTS

| | | | |
|---|---|---|---|
| 6,111,897 A * | 8/2000 | Moon | 370/535 |
| 6,631,144 B1 * | 10/2003 | Johansen | 370/516 |
| 6,876,678 B1 * | 4/2005 | Chow et al. | 370/538 |
| 2003/0048813 A1 | 3/2003 | Lahav et al. | |
| 2004/0062277 A1 | 4/2004 | Flavin et al. | |
| 2004/0151506 A1 * | 8/2004 | Shiramizu et al. | 398/140 |
| 2004/0156325 A1 * | 8/2004 | Perkins et al. | 370/299 |
| 2004/0234263 A1 | 11/2004 | Ovadia et al. | |
| 2005/0013296 A1 | 1/2005 | Imazeki et al. | |
| 2006/0146882 A1 * | 7/2006 | Kim | 370/485 |

FOREIGN PATENT DOCUMENTS

| | | |
|---|---|---|
| WO | 02/063834 A1 | 8/2002 |

* cited by examiner

METHOD AND APPARATUS FOR SIGNAL SPLITTING AND COMBINING

This application is a continuation of International Patent Application No. PCT/CN2006/000505, filed Mar. 24, 2006, which claims priority to Chinese Patent Application No. 200510063017.2, filed Apr. 1, 2005, both of which are hereby incorporated by reference.

FIELD OF THE INVENTION

The present invention relates to a technique for processing an asynchronous signal, and more particularly, to a method and apparatus for splitting an asynchronous signal and a method and apparatus for combining signals.

BACKGROUND OF THE INVENTION

The Optical Transport Hierarchy (OTH) technique is a new generation of transport hierarchy developed after the Synchronous Digital Hierarchy (SDH)/Synchronous Optical Network (SONET). For the transfer of the data in the OTH, Telecommunication Standardization Sector of the International Telecommunication Union (ITU-T) G.709 recommendation has defined signals to perform different functions, such as Optical channel Data Unit (ODU) as a connection signal, Optical channel Transport Unit (OTU) as a transport signal, Optical channel Payload Unit (OPU) and Optical channel Data Tributary Unit Group (ODTUG).

The frame format of ODUk is shown in FIG. 1, where k=1, 2, 3. ODUk has 4×3824=16320 bytes in total, where k=1, 2, 3. The area in Columns 1-14 of Row 1 is the area reserved for Frame Alignment (FA) and OTUk Overhead (OTUk OH), the area in Columns 1-14 of Rows 2-4 is the ODUk OH area, and the other area in Rows 15-3824 is the OPUk area which has 4×3810 bytes. Bytes 1-6 of the ODUk frame are FA bytes.

ODUk may be adapted to OTUk by mapping, and the adaptation of the frame format of ODUk to OTUk is shown in FIG. 2. Through filling the FA area with FA bytes and OTUk OH area with the OTUk overhead bytes, and through adding Columns 3825-4080 (4×256 bytes) which are filled with OTUk Forward Error Correction (FEC) Reed-Solomon code (RS), the OTUk frame is obtained. The OTUk frame has 4×4080=15296 bytes in total and the 1-6 bytes are Frame Alignment bytes.

The bit rate of ODUk (k=1, 2, 3) as a connection signal at three levels is calculated as follows:

ODU1:239/238×2.48832 Gbps=2.498775126 Gbps;

ODU2:239/237×9.95328 Gbps=10.037273924 Gbps;

ODU3:239/236×39.81312 Gbps=40.319218983 Gbps.

In other words, the bit rate of ODUk (k=1, 2, 3) is calculated on the basis of the formula of 239/(239−k)×"bit rate of n order Synchronous Transfer Mode (STM-N)".

The bit rate of OTUk (k=1, 2, 3) as a transport signal at three levels is calculated as follows:

OTU1:255/238×2.48832 Gbps=2.66605714285714 Gbps;

OTU2:255/237×9.95328 Gbps=10.7092253164557 Gbps;

OTU3:255/236×39.81312 Gbps=43.018413559322 Gbps.

In other words, the bit rate of OTUk (k=1, 2, 3) is calculated on the basis of the formula of 255/(239−k)×"bit rate of STM-N".

However, the existing signal transport technologies through a backplane and cross-point device often cannot support the transport of serial signals such as high rate signal ODU2/OTU2 or ODU3/OTU3. For example, currently, for the asynchronous cross-point device maturely applied in the industry, the bit rate of its port is up to 3.6 Gbps, which can only support the asynchronous switching function of the ODU1 serial signal.

The OTU2/ODU2 signal at a bit rate level of 10 Gbps is usually split into parallel signals of 4 bits, and the OTU3/ODU3 signal at a bit rate range of 40 Gbps is usually split into parallel signals of 16 bits. Framing processing of the split parallel signals also should be performed to ensure that the sink can combine the split parallel signals to obtain the source signal by frame alignment.

Currently, before transported, the OTN frame is split into 4 channels with 16 bytes in each block. FIG. 3 is a schematic diagram illustrating how the OTU2 frame is split in the OTN. As shown in FIG. 3, the area shaded with skew lines is the frame header area including OTUk FA. The OTU2 frame is usually split into 4 channels directly in the sequence of bytes, i.e. bytes 1-4080 for channel 1, bytes 4081-8160 for channel 2, bytes 8161-12240 for channel 3, bytes 12241-16320 for channel 4. As shown in FIG. 3a, the frame header area is in channel 1. Therefore, the sink can not implement the frame alignment and obtain the source signal through restoring and combining. For the purpose of solving this problem, as shown in FIG. 3b, the sequences of channels are adjusted at the beginning of the split frames 2, 3 and 4 so that the frame headers can be located in channels 2, 3 and 4 respectively. Therefore, each channel has a frame header area for frame alignment, and frame alignment and combination at the sink can be performed normally.

In the conventional method for splitting, it is required that each frame can be split into $2^i$ channels and each channel includes integral blocks, wherein the "i" is a natural number. For a calculation of the size of one frame, supposing that the size of the frame is F, the number of channels is C, the number of blocks included in each channel is B, a block includes S bytes, and that the block is larger than the frame area, the size of the) frame F is equal to C×B×S, i.e. F=C×B×S.

Therefore, there is a requirement for the size of the frame according to the conventional method. With respect to the ODUk/OTUk frame format, the frame alignment area has 6 bytes, and the minimum size of a block should be 6 bytes.

For example, with respect to the OTU2 frame format above, the size of the OTU2 frame is 16320 bytes; when the OTU2 frame is split into 4 channels (for the 10 Gbps level, 4 channels can be processed conveniently), the size of the OTU2 frame 16320=6 byte/block×4 channels×255, i.e., there are 255 blocks in each channel after an OTU2 frame is split.

With respect to the ODU2 frame format, the OTU2 FA bytes are set in the ODU2 frame, where the FA area is the shaded area and includes 6 bytes. The size of the ODU2 frame is 15296 bytes, which satisfies the equation of 15296=16 byte/block×4 channel×239, i.e., there are 239 blocks in each channel after a frame is split.

With respect to the OTU3 frame format, the size of the OTU3 frame is 16320 bytes, and the OTU3 frame is split into 16 channels, and the size of the OTU3 frame satisfies the expression of 16320=16 byte/block×16 channel×63.75, i.e., there are 63.75 blocks in each channel after a frame is split. Because 63.75 is not an integer, the splitting can not be implemented.

With respect to the OTU3 frame format, the size of the OTU3 frame is 15296 bytes, the OTU3 frame is split into 16 channels, then the size of the OTU3 frame satisfies the expression of 16320=16 byte/block×16 channel×63.75, i.e., there are 59.75 blocks in each channel after a frame is split. Because 59.75 is not an integer, the splitting can not be implemented.

It can be seen that the above conventional method for signal splitting can not be applicable to some frame formats in the OTN system. Therefore, the signal processing capacity of the OTN system is not perfect enough, which is a shortcoming of the OTN system. As a result, many functions of the OTN system can not be implemented in many cases, such as the case of the uniformed transport and switch of various signals.

SUMMARY

In view of the above, the present invention provides a method for splitting a signal in OTN at a higher rate of a variety of levels into signals at a lower rate level.

A method for splitting an asynchronous signal includes:

buffering, according to frame sequence, an asynchronous signal to be split; and sending n frames of data respectively on n channels in parallel whenever n frames of data have been buffered. N is a ratio of a rate level of the asynchronous signal before split to a rate level of the asynchronous signal after split.

Preferably, the method further includes:

synchronizing a frequency of buffering each frame of data with an associated asynchronous signal clock of the asynchronous signal to be split. A frequency of sending the n frames of data in parallel is 1/n of the frequency of buffering each frame of data.

Preferably, the process of buffering an asynchronous signal to be split includes:

writing the asynchronous signal into one group of buffers according to the frame sequence, wherein there are two groups of buffers, each group including n buffers and each buffer storing one frame of data; and writing the asynchronous signal into the other group of buffers when the one group of buffers are full; and the process of sending n frames of data respectively on n channels in parallel includes: reading the n frames of data in the one group of buffers on n channels respectively in parallel when the one group of buffers are full.

An apparatus for splitting an asynchronous signal includes:

a first module, configured to buffer, according to frame sequence, an asynchronous signal to be split; and a second module, configured to manage the first module to buffer the asynchronous signal to be split, and send n frames of data respectively on n channels in parallel whenever n frames of data have been buffered, wherein n is a ratio of a rate level of the asynchronous signal before split to a rate level of the asynchronous signal after split.

Preferably, the first module includes: 2n First In First Out (FIFO) memories in two groups, each group including n FIFO memories and each FIFO memory storing one frame of data each time; and the second module includes: a frequency-divided-by-n module, configured to reduce a frequency of an input clock signal to 1/n of the frequency of the input clock signal, and send an output clock signal with a frequency of 1/n of the frequency of the input clock signal; a write address generation module, configured to manage a write operation of each FIFO memory to buffer the n frames of data of the asynchronous signal according to the frame sequence; and a read address generation module, configured to manage a read operation of each FIFO memory to send n frames of data respectively on n channels in parallel whenever n frames of data have been buffered.

Preferably, the write address generation module is configured to generate a write address control signal and a write enabling control signal according to the frequency of the input clock signal, input the write address control signal and the write enabling control signal to each FIFO memory, and manage the asynchronous signal to be serially written into one group of FIFO memories according to the frame sequence; and the read address generation module is configured to receive the output clock signal from the frequency-divided-by-n module, generate a read address control signal and a read enabling control signal according to the output clock signal and send the read address and the read enabling control signal to each FIFO memory, and manage n frames of data in the other group of FIFO memories to be read in parallel.

Preferably, the apparatus further includes a frame searching module configured to:

perform frame searching for the asynchronous signal, send a frame pulse signal and an associated asynchronous clock signal to the write address generation module in response to performing the frame searching for the asynchronous signal, send the associated asynchronous clock signal to the frequency-divided-by-n module which reduces a frequency of the associated asynchronous clock signal to 1/n of the frequency of the associated asynchronous clock signal, and send the output clock signal with a frequency of 1/n of the frequency of the associated asynchronous clock signal to the read address generation module, and send the frame pulse signal to the read address generation module. Wherein the write address generation module is configured to generate the write address control signal and the write enabling control signal according to the frequency of the associated asynchronous clock signal and the frame pulse signal; and the read address generation module is configured to generate the read address control signal and the read enabling control signal according to the output clock signal and the frame pulse signal.

A method for signal combination includes:

buffering n channels of parallel signals to be combined simultaneously according to frame sequence; and sending n channels of frames serially after one frame is buffered for each of the n channels of the parallel signals; wherein n is a ratio of a rate level of the parallel signals after combined to a rate level of the parallel signals before combined.

Preferably, the method further includes:

synchronizing a frequency of buffering a frame with a reference clock of the n channels of the parallel signals to be combined; and setting a frequency of sending a frame buffered to be n times the frequency of buffering the frame.

Preferably, the process of buffering n channels of parallel signals to be combined simultaneously includes: writing the n channels of the parallel signals into one group of buffers simultaneously according to the frame sequence, wherein there are two groups of buffers, each group including n buffers and each buffer storing one frame of data; and writing next n channels of the parallel signals into the other group of buffers when the one group of buffers are full; and the process of sending n channels of frames serially after one frame is buffered for each of the n channels of the parallel signals includes: reading the n channels of frames buffered in the one group of buffers serially according to the frame sequence whenever the one group of the buffers are full.

An apparatus for signal combination includes:

a first module, configured to buffer n channels of parallel signals to be combined simultaneously according to frame sequence; and a second module, configured to manage the first module to buffer the n channels of the parallel signals to be combined simultaneously, and send n channels of frames serially after one frame is buffered for each of the n channels of the parallel signals; wherein n is a ratio of a rate level of the parallel signals after combined to a rate level of the parallel signals before combined.

Preferably, the first module includes: 2n First In First Out (FIFO) memories in two groups, each group including n FIFO memories and each FIFO memory storing one frame of data each time; and the second module includes:

a frequency-multiplied-by-n module, configured to convert a frequency of an input clock signal to n times the frequency of the input clock signal, and send an output clock signal with a frequency of n times the frequency of the input clock signal; a write address generation module, configured to manage a write operation of each FIFO memory to buffer the n channels of the parallel signals to be combined simultaneously; and a read address generation module, configured to manage a read operation of each FIFO memory to send the n channels of frames serially after one frame is buffered for each of the n channels of the parallel signals.

Preferably, the write address generation module is configured to generate a write address control signal and a write enabling control signal according to the frequency of the input clock signal, and send the write address control signal and the write enabling control signal to each FIFO memory, and manage the n channels of the parallel signal to be written simultaneously into one group of FIFO memories in parallel according to the frame sequence; and the read address generation module is configured to receive the output clock signal from the frequency-multiplied-by-n module, generate a read address control signal and a read enabling control signal according to the output clock signal, and send the read address control signal and the read enabling control signal to each FIFO memory to manage the other group of FIFO memories to send the n channels of frames serially.

Preferably, the apparatus further includes a frame alignment unit, configured to perform frame searching for each channel of the parallel signals to search for frame start locations of the n channels of the parallel signals, align the frame start locations of the n channels of the parallel signals to one frame phase, send to the 2n FIFO memories the n channels of the parallel signals after aligned, and send a reference frame pulse signal to the write address generation module and the read address generation module;

wherein the write address generation module is configured to generate the write address control signal and the write enabling control signal according to the frequency of the input clock signal and the reference frame pulse signal; and the read address generation module is configured to generate the read address control signal and the read enabling control signal according to the output clock signal and the reference frame pulse signal.

Preferably, the apparatus further includes: an interface unit, configured to perform clock restoration for n channels of parallel signals to obtain clocks, and select one of the clocks as a reference clock, and send to the frame alignment unit the reference clock and the parallel signals to be aligned; wherein the frame alignment unit aligns the parallel signals according to the reference clock; and the frequency-multiplied-by-n module converts the frequency of the reference clock to n times the frequency of the reference clock and sends the output clock with a frequency of n times the frequency of the reference clock to the write address generation module and the read address generation module.

As can be seen from the above, according to a method and apparatus for splitting the signal in the OTN, the signal is split on the basis of a frame. Therefore, the frame header area of each frame is completely reserved and no adjustment of the frame header area is needed during the splitting, and the process of splitting is simplified greatly. Moreover, because there is no requirement for the number of bytes contained in each frame, various signals in the OTN can be split. Meanwhile, an embodiment of the present invention also provides a method and apparatus for combining signals in the OTN. The low rate signals are combined on the basis of a frame, and the frame header area of each frame is completely reserved. Therefore, the process of combining signals is simplified greatly, and there is no limit to the number of bytes in each frame for the signals to be combined.

DETAILED DESCRIPTION OF EMBODIMENTS

Figure 1:
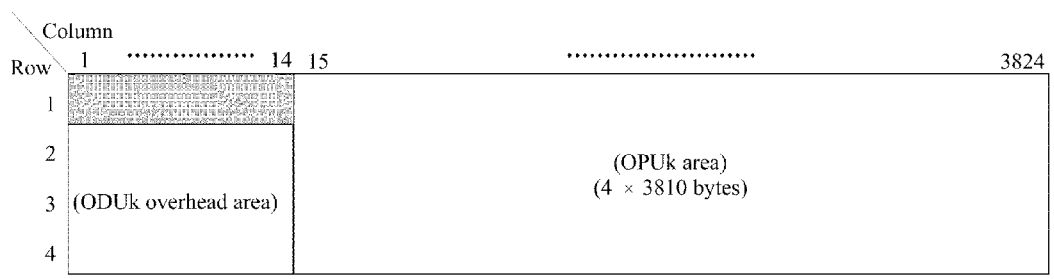
FIG. 1 is a schematic diagram illustrating the frame format of an ODUk signal in the OTN.
Figure 2:
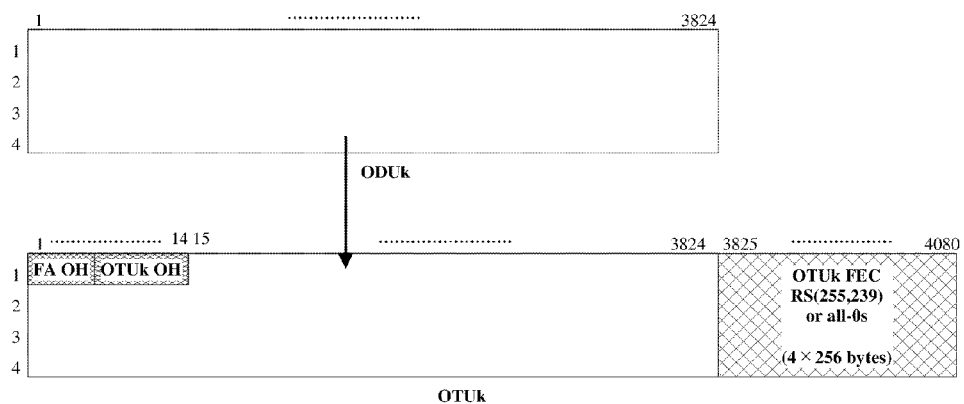
FIG. 2 is a schematic diagram illustrating how to map the format of ODUk to OTUk in the OTN.
Figure 3:
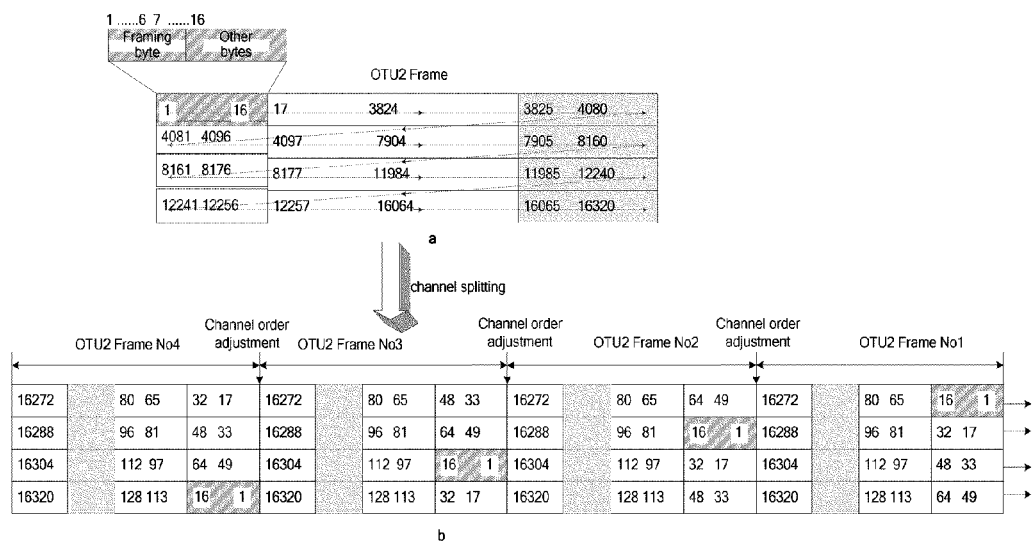
FIG. 3 is a schematic diagram illustrating OTU2 frame splitting in the OTN.

The present invention is described as follows in detail with reference to the accompanying drawings and specific embodiments.

According to a method for splitting signal in accordance with an embodiment of the present invention, a signal is split on the basis of a frame. The high rate signal is buffered according to frame sequence. Whenever n frames have been buffered, data of the n frames is sent in parallel. The above process is repeated until the high rate signal is completely split into required low rate signal. The letter n represents the ratio of the rate level of the high rate signal to that of the low rate signal.

The application in the OTN is taken as an example to describe the method for splitting. For example, supposing that an ODU2 signal is to be split into signals at the ODU1 rate level, the ODU2 signal is buffered serially; after 4 frames of the ODU2 signal are buffered, the 4 frames are sent in parallel. Meanwhile, the following frames of the ODU2 signal are buffered and sent in parallel after there are another 4 frames in the buffer. The above operation is repeated, thus one channel of serial ODU2 signal is successfully split into 4 channels of parallel signals. The 4 channels of parallel signals have to be combined to form a complete ODU2 signal, thus, for description convenience, ODU2[3:0] is used in the embodiment of the present invention to represent the 4 channels of parallel signals at the ODU1 rate level which the ODU2 has been split into. In this process, because the splitting is based on a frame, the frame header area of each frame is completely reserved and no adjustment during the splitting is needed, the splitting is simplified greatly and there is no requirement for the number of bytes contained in each frame.

With respect to the OTU2 signal, when the OTU2 signal is to be split into signals at the OTU1 rate level, the above splitting process can also be adopted. In the embodiment of the present invention, OTU2[3:0] is used to represent the 4 channels of parallel signals at the OTU1 rate level which the OTU2 signal has been split into.

With respect to the ODU3/OTU3 signal, when the ODU3/OTU3 signal is to be split into signals at the ODU1/OTU1 rate level, each time 16 frames have been buffered, the 16 frames are sent in parallel. Therefore, one channel of the ODU3/OTU3 signal is split into 16 channels of parallel signals at the ODU1/OTU1 rate level. For a convenient description, ODU3 [15:0]/OTU3 [15:0] is used in the embodiment of the present invention to represent 16 channels of parallel signals at the ODU1/OTU1 rate level which the ODU3/OTU3 signal has been split into. When the ODU3/OTU3 signal is to be split into signals at the ODU2/OTU2 rate level, each time 4 frames have been buffered, the 4 frames are sent in parallel, and the following process is similar to that splitting the ODU2/OTU2 signal.

Figure 4:
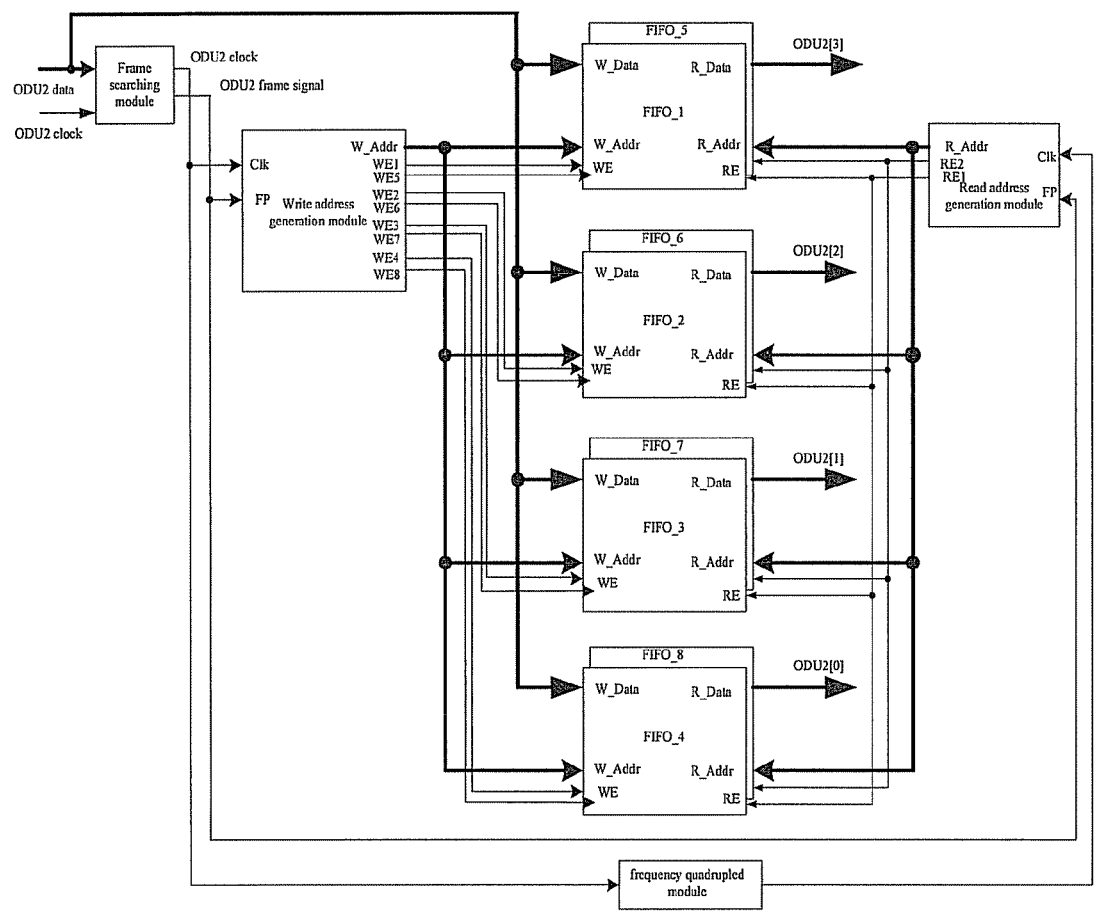
FIG. 4 is a schematic diagram illustrating an apparatus for ODU2 splitting in accordance with an embodiment of the present invention.

According to the above method, FIG. 4 illustrates an apparatus for ODU2 splitting in accordance with an embodiment of the present invention. As shown in FIG. 4, the apparatus includes a frame searching module, a write address generation module, a read address generation module, a frequency-divided-by-4 module, and 8 First In First Out (FIFO) memories FIFO_1, FIFO_2, FIFO_3, FIFO_4, FIFO_5, FIFO_6, FIFO_7 and FIFO_8. The frequency-divided-by-4 module reduces the frequency of the input clock signal to ¼ of the original frequency of the input clock signal. The write address generation module manages the write frequency of the write pointer of each FIFO memory, and the read address generation module manages the read frequency of the read pointer of each FIFO memory. The 8 FIFO memories are divided into two groups, with 4 FIFO memories in each group, and each FIFO memory can store data of one ODU2 frame.

The process of splitting the ODU2 signal by use of the apparatus above is described as follows.

The input ODU2 asynchronous signal has an associated asynchronous signal clock Clk and the frame searching module carries out frame searching for the input ODU2 asynchronous signal to obtain a Frame Pulse (FP) signal. The associated asynchronous signal clock Clk and the FP signal enter the write address generation module together. The associated asynchronous signal clock Clk is used to manage the write frequency of an FIFO, and the FP is used to manage the write start address of an FIFO. The write address generation module, according to the input Clk and FP, generates Write Address control signal W_Addr and Write Enabling control signal WEi (i=1, 2, . . . , 8). The W_Addr enters the W_Addr port of each FIFO and the WEi enters the WE port of each FIFO so as to manage the write of the FIFO. The rules for generating the W_Addr and the WEi are as follows: the W_Addr of an FIFO changes circularly so that the ODU2 data frames are successively written in each FIFO according to frame sequence; and the WEi is effective in turn so that one group of FIFO memories are written after the other group of FIFO memories are full. Two corresponding FIFO memories in the two groups in FIG. 4 share one group of W_Addr lines to receive the W_Addr signal, i.e., FIFO_1 and FIFO_5 share one group of W_Addr lines, FIFO_2 and FIFO_6, FIFO_3 and FIFO_7, and FIFO_4 and FIFO_8, thus wiring is simplified. One group of W_Addr lines for each FIFO memory is also allowed.

The associated asynchronous signal clock Clk is also input to the frequency-divided-by-4 module, and the frequency-divided-by-4 module divides a frequency of the associated asynchronous signal clock Clk and generates an output signal. The output signal and the FP signal are input to the Clk port and the FP port of the read address generation module respectively. The associated asynchronous signal clock Clk manages the read frequency of an FIFO memory and the FP manages the write start address of an FIFO memory. The read address generation module, according to the input Clk and FP, generates Read Address control signal R_Addr and Read Enabling control signal RE1 and RE2. To manage the read of each FIFO respectively, the R_Addr enters the R_Addr port of each FIFO, while the RE1 enters the first group of FIFO memories FIFO_1, FIFO_2, FIFO_3 and FIFO_4, and the RE2 enters the second group of FIFO memories FIFO_5, FIFO_6, FIFO_7 and FIFO_8. The rules for generating the R_Addr and the RE are as follows: the R_Addr changes circularly; and the RE signals RE1 and RE2 are effective alternately such that the data in the two groups of FIFO memories is alternately read in parallel. As shown in FIG. 4, the corresponding FIFO memories in the two groups share one group of R_Addr lines, i.e. FIFO_1 and FIFO_5 share one group of R_Addr lines, FIFO_2 and FIFO_6, FIFO_3 and FIFO_7, and FIFO_4 and FIFO_8. Certainly, either of corresponding FIFO memories may have its own group of R_Addr lines. Further, the W_addr generated should ensure that the operations of read and write do not occurs simultaneously in one group of FIFO memories, i.e., the operations of read and write are in a ping-pong manner, in other words, reading FIFO_5 to FIFO_8 when writing FIFO_1 to FIFO_4, and reading FIFO_1 to FIFO_4 when writing FIFO_5 to FIFO_8. It can be seen that the read frequency of FIFO is ¼ of the write frequency of FIFO.

The ODU2 data is written into FIFO_1, FIFO_2, FIFO_3 and FIFO_4 in order, and each FIFO stores one frame of data. After 4 frames are respectively written into FIFO_1 to FIFO_4 in order, it is the turn to write another 4 frames respectively into FIFO_5, FIFO_6, FIFO_7 and FIFO_8 in order. Meanwhile, the read pointer starts to read data in parallel and simultaneously from FIFO_1, FIFO_2, FIFO_3 and FIFO_4 to form and output low rate parallel data ODU2[0], ODU2[1], ODU2[2] and ODU2[3], and the read rate is ¼ of the ODU2 rate. In this manner, through the alternative read and write, the conversion is realized from the ODU2 signal to parallel signals ODU2[3:0] (i.e. the signals at the ODU1 rate level).

The ODU2[3:0] signals obtained through splitting are still signals containing FA areas in each channel, and the data delay is 4 times the period of the ODU2 frame.

The processing of the OTU2 signal is substantially the same as that of the ODU2 signal except that each FIFO of the apparatus for splitting the OTU2signal stores one frame of OTU2 data.

Figure 5:
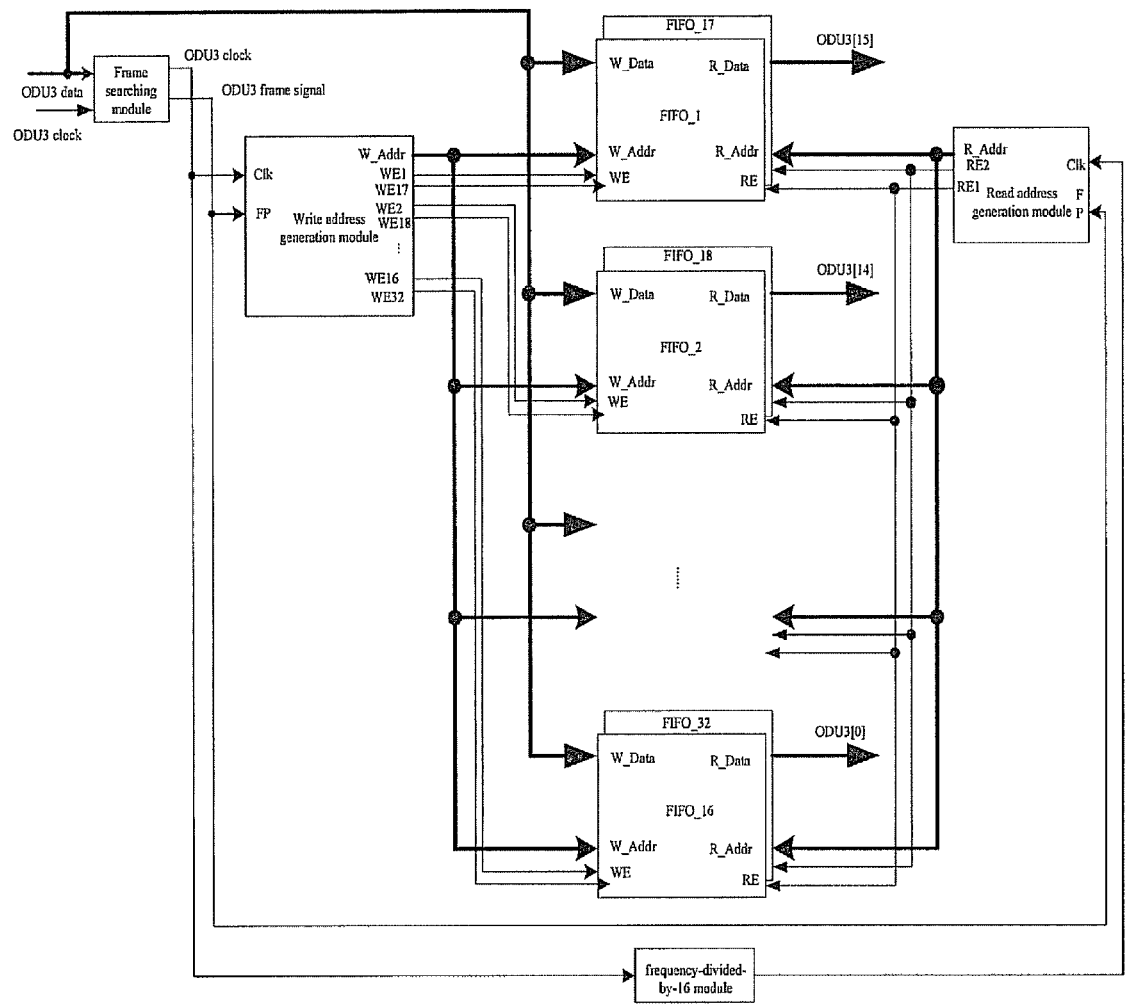
FIG. 5 is a schematic diagram illustrating an apparatus for ODU3 splitting in accordance with an embodiment of the present invention.

With respect to the ODU3/OTU3 signal to be split into signals at the ODU1/OTU1 rate level, the apparatus for splitting the ODU3/OTU3 signal is similar to the apparatus for splitting the ODU2 signal. FIG. 5 is a schematic diagram illustrating a structure of an apparatus for splitting an ODU3 signal in accordance with an embodiment of the present invention. As shown in FIG. 5, the difference from FIG. 4 is that 32 FIFO memories are configured in the apparatus for splitting the ODU3 signal, with 16 in each group, and a frequency-divided-by-16 module is configured to reduce the frequency of the input signal to 1/16 of the original frequency of the input signal. A write address generation module manages the write of the 32 FIFO memories and a read address generation module manages the read of the 32 FIFO memories. The structure of an apparatus for splitting other signals can be obtained by those skilled in the art by analogy according to embodiments of the present invention.

An embodiment of the present invention also provides a method for combining signals corresponding to the above method for splitting. The method for combining signals includes: buffering n channels of data of slow rate parallel signals which are aligned on the basis of a frame, reading the buffered data according to frame sequence successively at the rate equal to n times the rate of buffering the n channels of data, determining a frame header area according to a frame phase after aligned, and combining the buffered data to obtain a high rate signal and sending the high rate signal serially.

In general, the frame phases of the n channels of low rate signals before combined are different, the process of alignment of the n channels of low rate signals before combined is usually necessary and the process includes: restoring clocks and data of the n channels of parallel signals, performing frame searching of the n channels of the restored data by using any of the restored clocks as a reference clock, finding a frame start location of each of the n channels of the restored data, aligning the n channels of the restored data to one frame phase according to a frame start location of a certain channel of the restored data, and generating a reference frame pulse signal. The implementation of this process is described below with reference to FIG. 10.

For example, during the combination of the ODU2[3:0] into ODU2, where the ODU2[3:0] is obtained by the above method for splitting a signal, the combination process includes: restoring clocks and data of n channels of parallel signals ODU2[3:0], performing frame searching of the 4 channels of data by taking one of the 4 channels of the restored clocks as a reference clock, finding a frame start location of each of the 4 channels of the restored data, aligning frame start locations of the 4 channels of the restored data to one frame phase, and generating a reference frame pulse signal; and writing the 4 channels of aligned data along with the reference frame pulse signal in parallel into memories to be buffered on the basis of a frame, and reading the 4 channels of aligned data successively according to frame sequence at a rate equal to 4 times the write rate to obtain the ODU2 data. The above operation is repeatedly performed in a ping-pong manner, and the low rate parallel signals ODU2[3:0] are restored to ODU2 signal.

Figure 6:
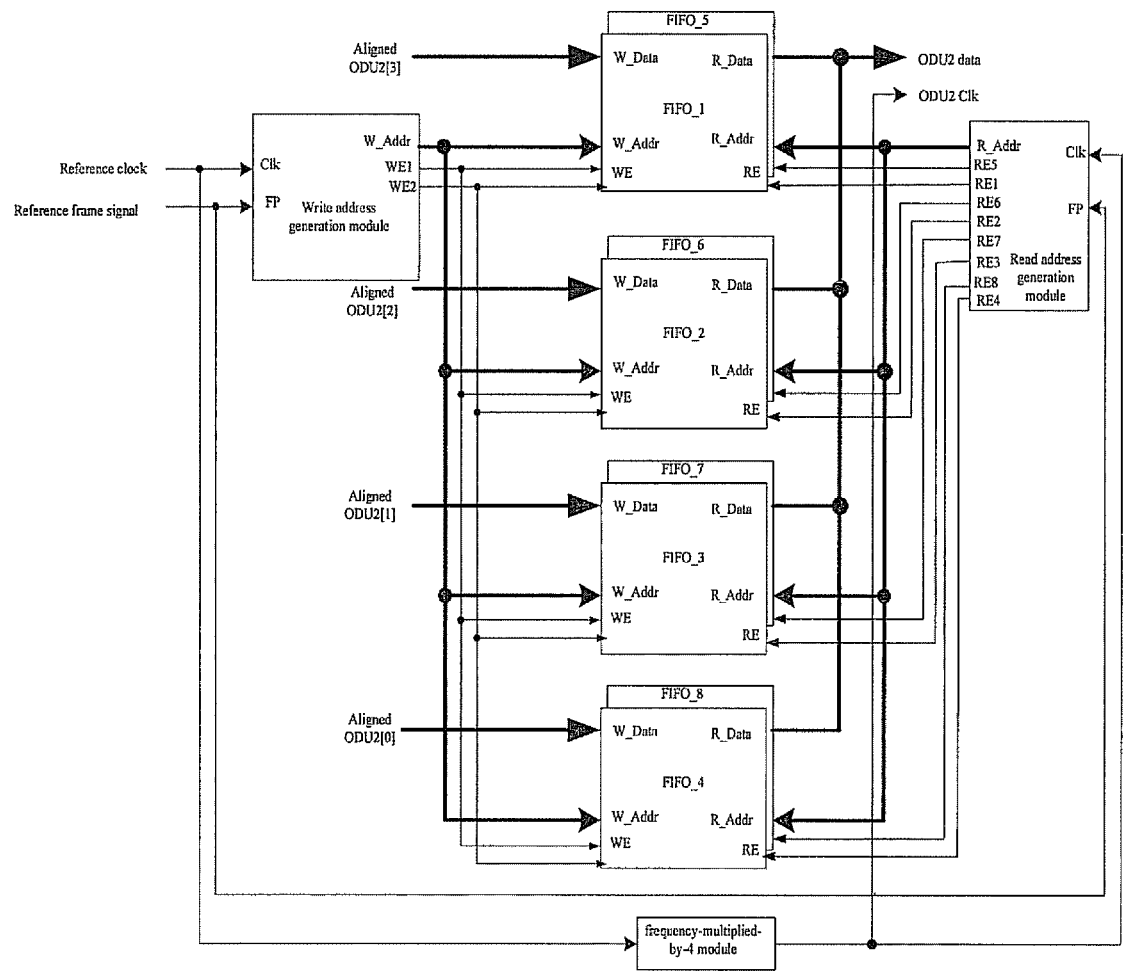
FIG. 6 is a schematic diagram illustrating an apparatus for ODU2 combination in accordance with an embodiment of the present invention.

On the basis of the above method for combining low rate signals, the present invention provides an apparatus for combining low rate signals as shown in FIG. 6.

FIG. 6 is a schematic diagram illustrating the structure of an apparatus for ODU2 combination by taking combining ODU2[3:0] into ODU2 signal as an example. The apparatus includes: a write address generation module, a read address generation module, a frequency quadrupled module, and 8 First In First Out (FIFO) memories FIFO_1, FIFO_2, FIFO_3, FIFO_4, FIFO_5, FIFO_6, FIFO_7 and FIFO_8. The 8 FIFO memories are divided into two groups, and each FIFO memory stores one frame of data.

The write address generation module generates W_Addr as well as WE1 and WE2 of each FIFO memory according to the reference clock and the reference frame pulse signal received. The reference clock is used to manage the write frequency of an FIFO, and the reference frame pulse signal is used to manage the write start address of an FIFO. The rules for generating the W_Addr as well as the WE1 and WE2 are described below. The W_Addr of an FIFO circularly changes, and WE1 and WE2 are alternately effective. In the first period of the reference clock, the WE1 is effective and the W_Addr points to the first group of FIFO memories, and the aligned parallel data ODU2[3:0], i.e. ODU2[0] to ODU2[3], is written into the first group of FIFO memories in parallel. When it is the next period of the reference clock, the WE2 is effective and the W_Addr points to the second group of FIFO memories, and the aligned parallel data ODU2[3:0], i.e. ODU2[0] to ODU2[3], is written into the second group of FIFO memories. Two corresponding FIFO memories in the two groups respectively may share one group of address wires, i.e., FIFO_1 and FIFO_5 share one group of address wires, FIFO_2 and FIFO_6, FIFO_3 and FIFO_7, and FIFO_4 and FIFO_8. And the write rate is the rate of the reference clock.

The frequency quadrupled module receives the reference clock and outputs a frequency-quadrupled clock signal. The frequency-quadrupled clock signal and the reference frame pulse signal enter the read address generation module together. The read address generation module generates the R_Addr of FIFO memories, as well as RE1, RE2, RE3, RE4, RE5, RE6, RE7 and RE8 for FIFO memories correspondingly. The reference clock is used to manage the read frequency of an FIFO, and the reference frame pulse signal is used to manage the read start address of an FIFO. The rules for generation are described below. The R_Addr of FIFO memories changes circularly, and RE signals are effective in turn. For example, in first ¼ of a period of the reference clock, the RE5 is effective and the R_Addr points to FIFO_5 to read the data frame in FIFO_5, in this way, the data in FIFO_5 to FIFO_8 have been successively read serially at the end of the first period of the reference clock. Then, in first ¼ of another period of the reference clock, the R-Addr points to FIFO_1 to read the data frame in FIFO_1, in this way, the data in FIFO_1 to FIFO_4 have been successively read serially at the end of this period of the reference clock. In this manner, when data of one group of 4 FIFO memories have been read, data of the other group of 4 FIFO memories start to be read, and the data in FIFO_1 to FIFO_8 are continually read serially. Two corresponding FIFO memories in the two groups respectively may share one group of R_Addr wires, i.e., FIFO_1 and FIFO_5 share one group of R_Addr wires, FIFO_2 and FIFO_6, FIFO_3 and FIFO_7, and FIFO_4 and FIFO_8. The data in the FIFO memories is read serially. While data of one group of 4 FIFO memories is read, the other group of 4 FIFO memories should be written. In other words, data of one group of 4 FIFO memories can not be read and written simultaneously.

In this manner, a write pointer is written into FIFO_1, FIFO_2, FIFO_3 and FIFO_4 respectively in parallel, and then into FIFO_5, FIFO_6, FIFO_7 and FIFO_8 respectively in parallel. The write rate is the rate of the reference clock. A read pointer starts to read data from FIFO_1, FIFO_2, FIFO_3 and FIFO_4 in sequence while the write pointer is written into FIFO_5, FIFO_6, FIFO_7 and FIFO_8, and the read rate is quadrupled frequency of the reference clock. The above process is performed circularly, and 4 channels of ODU2 parallel signals ODU2[3:0] (signals at 2.5 Gbps level) are converted to one channel of ODU2 signal.

The structure of an apparatus for OTU2 combination to combine OTU2[3:0] into the OTU2 signal is completely the same as that shown in FIG. 6.

Figure 7:
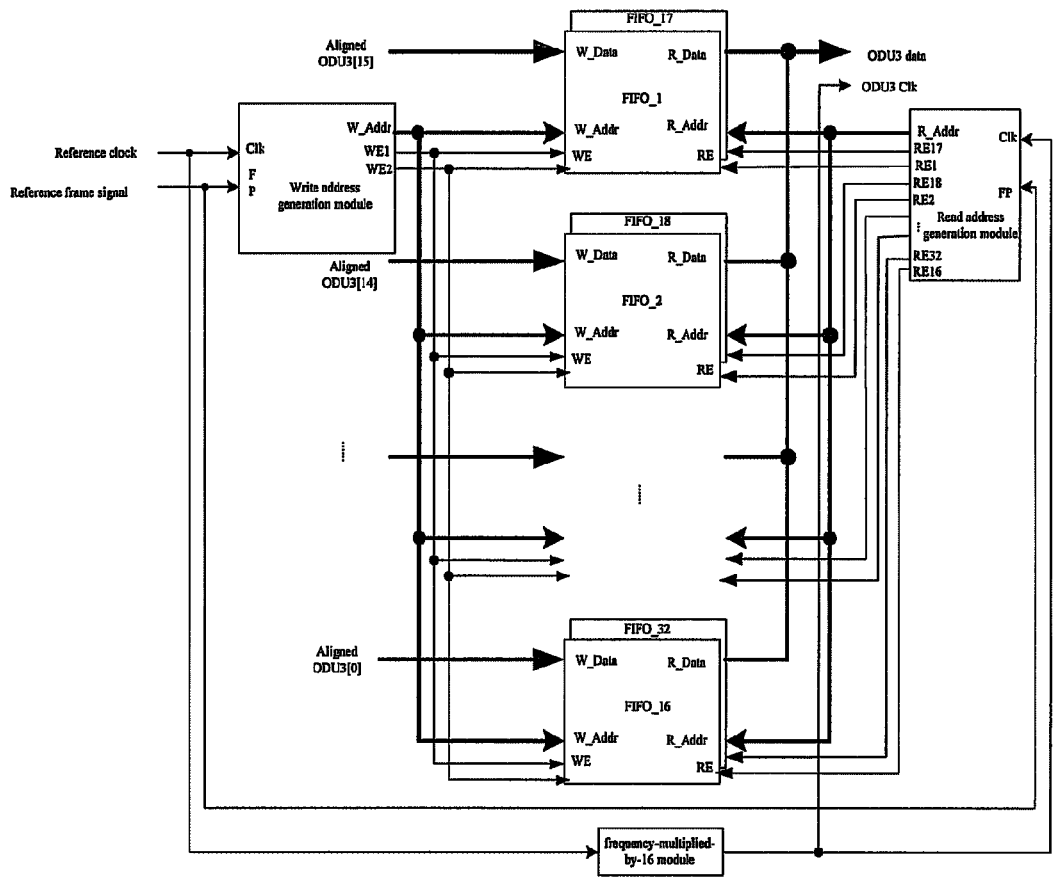
FIG. 7 is a schematic diagram illustrating an apparatus for ODU3 combination in accordance with an embodiment of the present invention.

FIG. 7 is a schematic diagram illustrating the structure of an apparatus for ODU3 combination to combine ODU3[15:0] into an ODU3 signal. What is different from the apparatus for ODU2 combination is: 32 FIFO memories are configured and divided into two groups with 16 FIFO memories in each group, frequency-multiplied-by-16 module replaces the frequency quadrupled module, where the frequency-multiplied-by-16 module converts the frequency of an input signal to 16 times the original frequency of the input signal, and the write address generation module manages the write of 32 FIFO memories while the read address generation module manages the read of 32 FIFO memories. The operations of the apparatus for OTU3 combination are similar to the apparatus for OTU2 combination. The structure of the apparatus for OTU3 combination to combine OTU3[15:0] into the OTU3 signal is similar to those shown in FIG. 7. The structure of an apparatus for combining other signals can be obtained by those skilled in the art by analogy.

Generally, as the frame phases of the n channels of low rate signals are asynchronous, the apparatus for combination is usually used together with the apparatus for frame alignment.

Figure 8:
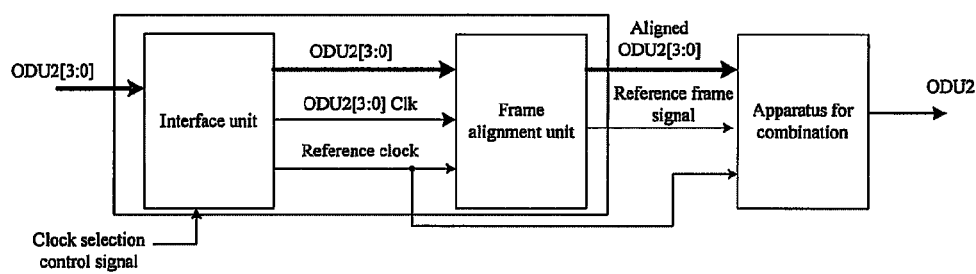
FIG. 8 is a block diagram illustrating a structure of an apparatus for combination including an interface unit and a frame alignment unit in accordance with an embodiment of the present invention.

For example, in the processing of the ODU2[3:0] as shown in FIG. 8, an interface unit and a frame alignment unit are further configured together with the apparatus for combination shown in FIG. 6 or 7. The interface unit is used for the clock restoration and clock selection of asynchronous signals and the frame alignment unit is used for frame alignment of asynchronous signals. The structure of an apparatus for processing other signals is similar to that shown in FIG. 8, and the process for processing other signals can be obtained by analogy.

When 4 channels of ODU2[3:0] to be combined enter the interface unit, the interface unit restores clocks and data for the 4 channels of parallel signals, and sends the 4 channels of restored clocks and data to the frame alignment unit. Furthermore, the interface unit selects one of the restored clocks as a reference clock according to the clock selection control signal, and sends the reference clock to the frame alignment unit and the apparatus for ODU2 combination respectively.

The frame alignment unit performs frame searching respectively for each channel of signals, finds frame start locations of the 4 channels of signals, aligns the frame start locations of the 4 channels of signals to one frame phase, and outputs the reference frame pulse signal and the 4 channels of the aligned data to the apparatus for ODU2 combination.

Two groups of FIFO memories are configured within the apparatus for ODU2 combination. Each group includes 4 FIFO memories, and each FIFO memory stores one frame of data. The aligned parallel data ODU2[3:0] and the reference frame pulse signal are written in parallel into one of the two groups of FIFO memories to be combined according to a frame using a low rate clock. At the same time, data is read from the other of the two groups of FIFO memories successively in frame sequence at the rate equal to 4 times the write rate and then the data is sent. A ping-pong manner for read and write is applied to the two groups to prevent conflicts between read and write. Finally, the ODU2 data is obtained; the data delay is 4 times of the period of ODU2 signals.

Figure 9:
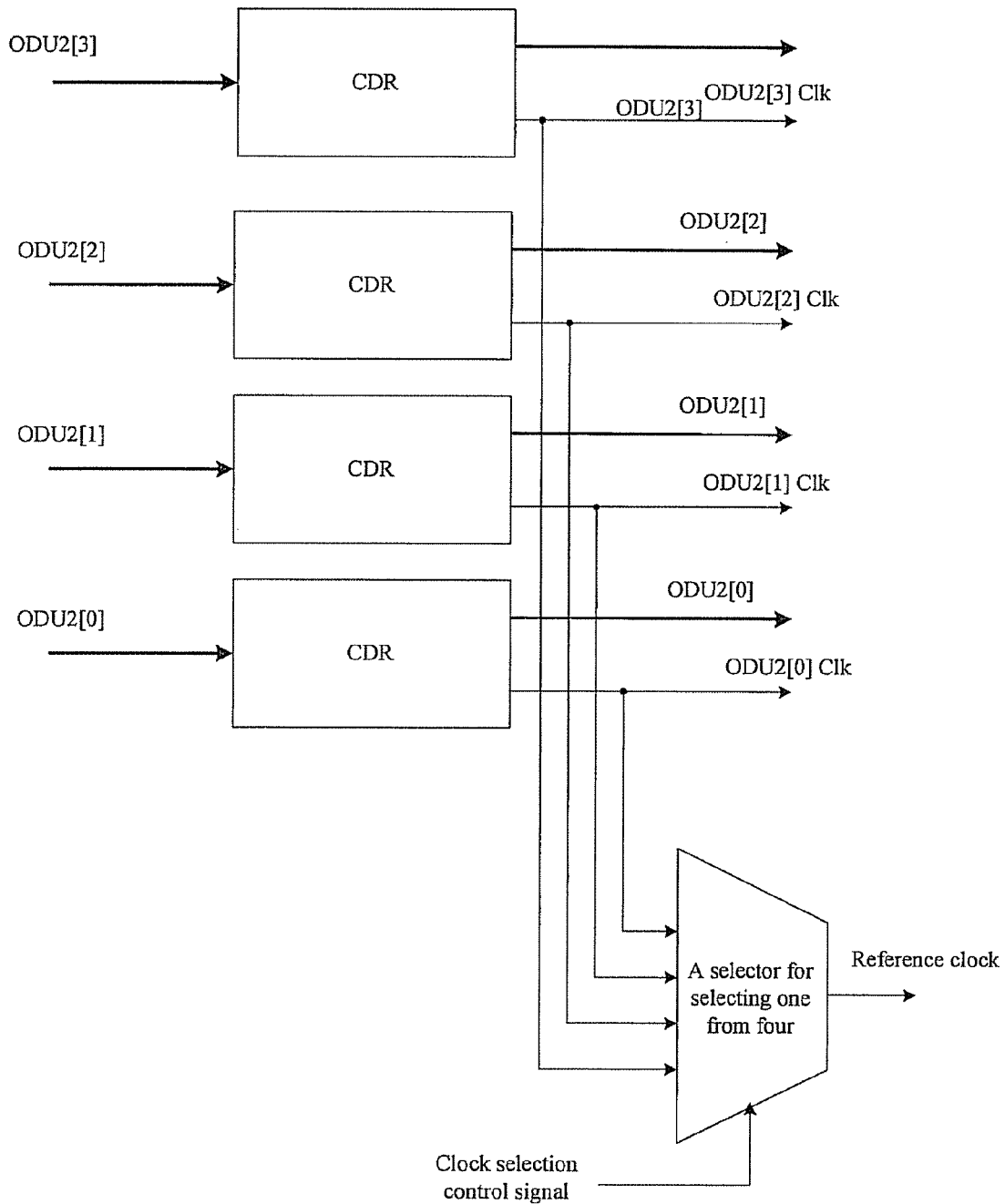
FIG. 9 is a schematic diagram illustrating a structure of the interface unit in an apparatus for ODU2 combination in accordance with an embodiment of the present invention.

A structure of the interface unit is shown in FIG. 9. The interface unit includes 4 Clock Data Restoration (CDR) modules and a selector for selecting one from four. The parallel signals ODU2[3:0], i.e. ODU2[0], ODU2[1], ODU2[2] and ODU2[3], enter the 4 CDR modules respectively. The 4 CDR modules restore the parallel signals ODU2[3:0] to obtain and send ODU2[n] data and corresponding ODU2[n] Clks, where n=0, 1, 2, 3. The restored 4 channels of the ODU2[n] Clks simultaneously enter the selector for selecting one from four, and the selector for selecting one from four selects one channel of the ODU2[n] Clks as the reference clock according to the clock selection control signal. Because the ODU2[3:0] signals are obtained by splitting one ODU2 signal, the ODU2[n] Clks have the same source clock and one of the ODU2[n] Clks can be selected as the read clock for the frame alignment of the FIFO to complete the frame alignment of ODU2[3:0] data, thus the delay skew between the 4 channels of data caused by cross-connection and backplane transmission is compensated.

The interface unit for the OTU2 signal is similar to that shown in FIG. 9. The structure of the interface unit for the ODU3/OTU3 signal is also similar to that shown in FIG. 9 except that there are 16 CDR modules and that a selector for selecting one from sixteen is used. The structure of an interface unit for other signals can be obtained by those skilled in the art by analogy.

Figure 10:
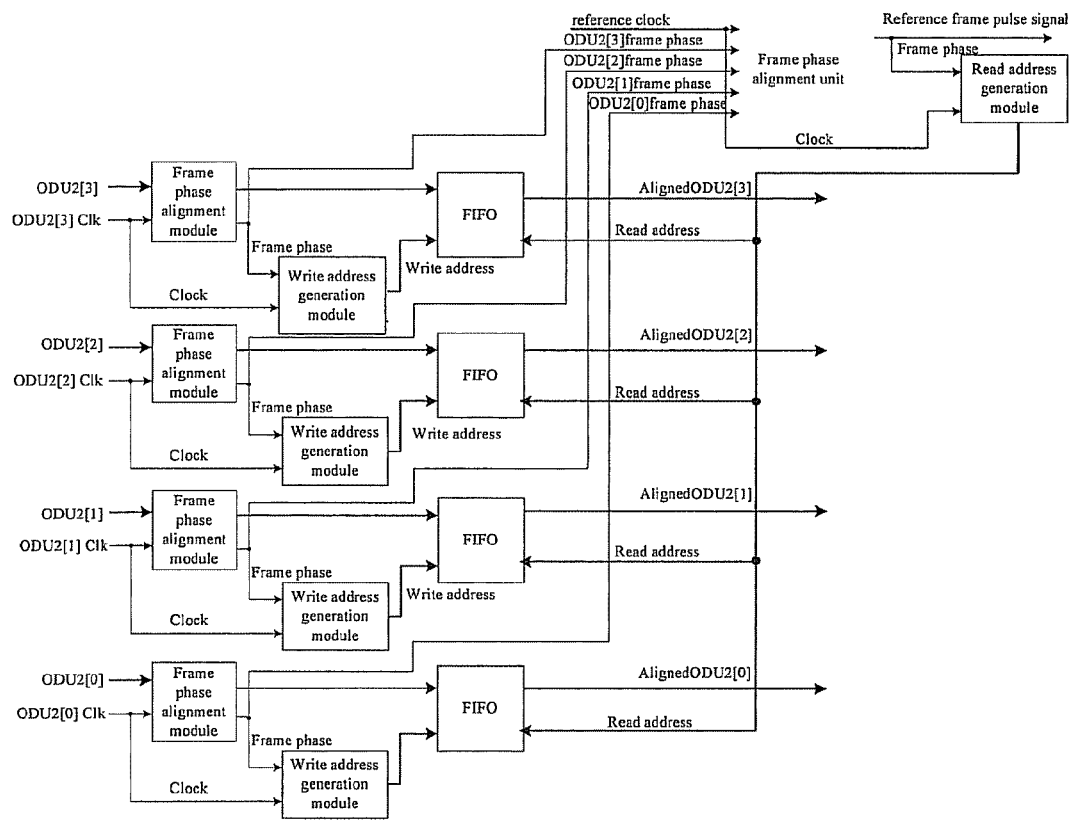
FIG. 10 is a schematic diagram illustrating a structure of the frame alignment unit in an apparatus for ODU2 combination in accordance with an embodiment of the present invention.

A structure of the frame alignment unit is shown in FIG. 10. The frame alignment unit includes 4 frame searching modules, 4 FIFO memories and 4 write address generation modules corresponding to the 4 FIFO memories respectively, a frame phase alignment module and a read address generation module.

Each channel of ODU2[n] data (n=0, 1, 2, 3) and ODU2[n] Clks (n=0, 1, 2, 3), which is restored by the CDR modules, enters frame searching modules respectively for frame searching. Frame phases of all channels obtained by the frame searching modules are output to a frame phase alignment module and write address generation modules of FIFO memories. The write address generation modules also receive corresponding ODU2[n] Clks, and generates and sends write addresses to corresponding FIFO memories. The frame phase alignment module aligns the frame phases of all channels to an appropriate location, and generates and sends a reference frame pulse signal to the read address generation module and the apparatus for ODU2 combination. The read address generation module receives the reference frame pulse signal and the reference clock, and generates and sends the R_Addr to each FIFO. Each FIFO repeats the read and write operation under the control of the R_Addr and the W_Addr to align 4 channels of signals to one frame phase. The one frame phase is one of frame pulse signals after the frame searching, i.e., the alignment is an internal automatic frame alignment operation. Because the clock frequency of the R_Addr is the same as the clock frequency of the W_Addr, the FIFO will not overflow or be empty if there is appropriate difference between the R_Addr and the W_Addr. The difference between the R_Addr and the W_Addr depends on the frame phase alignment module, and is relevant to the size of the FIFO.

Figure 11:
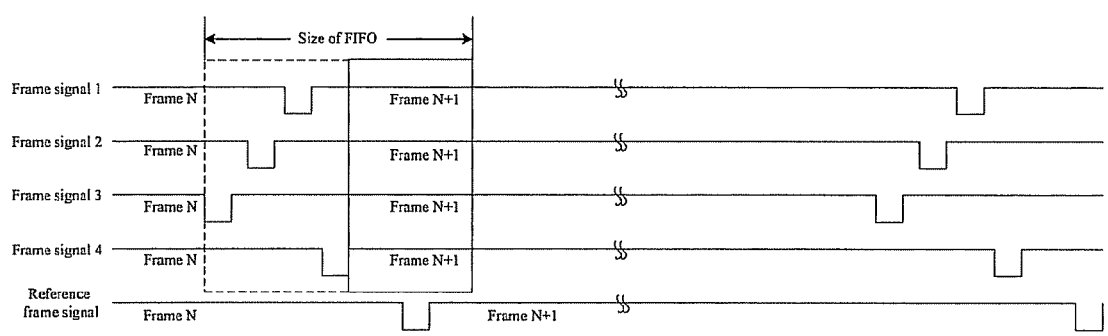
FIG. 11 is a sequence chart illustrating the process of frame alignment of the frame alignment unit in accordance with an embodiment of the present invention.

FIG. 11 is a sequence chart of the process of frame alignment. Because the size of each FIFO is limited, the maximum phase skew of the frame pulse signals can not exceed the range of the size of the FIFO, and the phase of the aligned reference frame pulse signal should be at the location with some delay behind the most lagged frame phase and within the range of the size of the FIFO, in other words, the phase of the reference frame pulse signal should be in the area of the real line block shown in FIG. 11.

The frame alignment unit for the OTU2 signal is completely the same as that shown in FIG. 10. The structure of the frame alignment unit for the ODU3/OTU3 signal is also similar to that shown in FIG. 10, except that there are 16 frame searching modules, 16 FIFO memories and 16 corresponding write address generation modules, and that a selector for selecting one from sixteen is used. A structure of a frame alignment unit for processing other signals can be obtained by those skilled in the art by analogy.

The above are only preferred embodiments of the present invention and are not for use in limiting the present invention. Any modification, equivalent replacement or improvement made under the spirit and principles of the present invention is included in the protection scope of the present invention.

What is claimed is:

1. An apparatus for splitting an asynchronous signal, comprising:
   a first module, configured to buffer, according to frame sequence, an asynchronous signal to be split; wherein the asynchronous signal comprises Optical Data Unit (ODU) or Optical Transport Unit (OTU);
   a second module, configured to manage the first module to buffer the asynchronous signal to be split, and send n frames of data respectively on n channels in parallel whenever n frames of data have been buffered, wherein the rate level of the asynchronous signal before split is n times of the rate level of the asynchronous signal after split;
   wherein the first module comprises:
   2n First In First Out (FIFO) memories in two groups, each group comprising n FIFO memories and each FIFO memory storing one frame of data each time; and
   the second module comprises:
   a frequency-divided-by-n module, configured to reduce a frequency of an input clock signal to 1/n of the frequency of the input clock signal, and send an output clock signal with a frequency of 1/n of the frequency of the input clock signal;
   a write address generation module, configured to manage a write operation of each FIFO memory to buffer the n frames of data of the asynchronous signal according to the frame sequence; and
   a read address generation module, configured to manage a read operation of each FIFO memory to send n frames of data respectively on n channels in parallel whenever n frames of data have been buffered;
   wherein the write address generation module is configured to generate a write address control signal and a write enabling control signal according to the frequency of the input clock signal, input the write address control signal and the write enabling control signal to each FIFO memory, and manage the asynchronous signal to be serially written into one group of FIFO memories according to the frame sequence; and
   the read address generation module is configured to receive the output clock signal from the frequency-divided-by-n module, generate a read address control signal and a read enabling control signal according to the output clock signal and send the read address control signal and the read enabling control signal to each FIFO memory, and manage n frames of data in the other group of FIFO memories to be read in parallel.

2. The apparatus of claim 1, further comprising a frame searching module configured to:
   perform frame searching for the asynchronous signal,
   send a frame pulse signal and an associated asynchronous clock signal to the write address generation module in response to performing the frame searching for the asynchronous signal,
   send the associated asynchronous clock signal to the frequency-divided-by-n module which reduces a frequency of the associated asynchronous clock signal to 1/n of the frequency of the associated asynchronous clock signal, and send the output clock signal with a frequency of 1/n of the frequency of the associated asynchronous clock signal to the read address generation module, and
   send the frame pulse signal to the read address generation module;
   wherein the write address generation module is configured to generate the write address control signal and the write enabling control signal according to the frequency of the associated asynchronous clock signal and the frame pulse signal; and
   the read address generation module is configured to generate the read address control signal and the read enabling control signal according to the output clock signal and the frame pulse signal.

3. An apparatus for asynchronous signal combination, comprising:
   a first module, configured to buffer n channels of parallel signals to be combined simultaneously according to frame sequence; wherein the asynchronous signal comprises Optical Data Unit (ODU) or Optical Transport Unit (OTU);
   a second module, configured to manage the first module to buffer the n channels of the parallel signals to be combined simultaneously, and send n channels of frames serially after one frame is buffered for each of the n channels of the parallel signals; wherein the rate level of the parallel signals after combined is n times of the rate level of the parallel signals before combined;
   wherein the first module comprises:
   2n First In First Out (FIFO) memories in two groups, each group comprising n FIFO memories and each FIFO memory storing one frame of data each time;
   the second module comprises:
   a frequency-multiplied-by-n module, configured to convert a frequency of an input clock signal to n times the frequency of the input clock signal, and send an output clock signal with a frequency of n times the frequency of the input clock signal;
   a write address generation module, configured to manage a write operation of each FIFO memory to buffer the n channels of the parallel signals to be combined simultaneously; and
   a read address generation module, configured to manage a read operation of each FIFO memory to send the n channels of frames serially after one frame is buffered for each of the n channels of the parallel signals;
   wherein n is a ratio of a rate level of the parallel signals after combined to a rate level of the parallel signals before combined;
   the write address generation module is configured to generate a write address control signal and a write enabling control signal according to the frequency of the input clock signal, and send the write address control signal and the write enabling control signal to each FIFO memory, and manage the n channels of the parallel signal to be written simultaneously into one group of FIFO memories in parallel according to the frame sequence; and the read address generation module is configured to receive the output clock signal from the frequency-multiplied-by-n module, generate a read address control signal and a read enabling control signal according to the output clock signal, and send the read address control signal and the read enabling control signal to each FIFO memory to manage the other group of FIFO memories to send the n channels of frames serially.

4. The apparatus of claim 3, further comprising a frame alignment unit, configured to perform frame searching for each channel of the parallel signals to search for frame start locations of the n channels of the parallel signals, align the frame start locations of the n channels of the parallel signals to one frame phase, send to the 2n FIFO memories the n channels of the parallel signals after aligned, and send a reference frame pulse signal to the write address generation module and the read address generation module;

wherein the write address generation module is configured to generate the write address control signal and the write enabling control signal according to the frequency of the input clock signal and the reference frame pulse signal; and the read address generation module is configured to generate the read address control signal and the read enabling control signal according to the output clock signal and the reference frame pulse signal.

5. The apparatus of claim 4, further comprising:

an interface unit, configured to perform clock restoration for n channels of parallel signals to obtain clocks, and select one of the clocks as a reference clock, and send to the frame alignment unit the reference clock and the parallel signals to be aligned;

wherein the frame alignment unit aligns the parallel signals according to the reference clock; and the frequency-multiplied-by-n module converts the frequency of the reference clock to n times the frequency of the reference clock and sends the output clock with a frequency of n times the frequency of the reference clock to the write address generation module and the read address generation module.

* * * * *